United States Patent [19]

Ischebeck et al.

[11] Patent Number: 5,088,866

[45] Date of Patent: Feb. 18, 1992

[54] INDICATOR-NUT THREADED COUPLING WITH LOAD-INDICATING DEVICE ADAPTED TO BE ARRANGED ON ANCHORS, IN PARTICULAR GROUTED ANCHORS FOR MINING OR THE LIKE

[75] Inventors: Ernst F. Ischebeck; Joachim Isenberg, both of Ennepetal, Fed. Rep. of Germany

[73] Assignee: Friedr. Ischebeck GmbH, Ennepetal, Fed. Rep. of Germany

[21] Appl. No.: 655,728

[22] Filed: Feb. 14, 1991

[30] Foreign Application Priority Data

Mar. 31, 1990 [DE] Fed. Rep. of Germany ....... 4010476

[51] Int. Cl.⁵ .................... F16D 31/02; E21D 20/02
[52] U.S. Cl. ........................ 411/10; 411/14; 116/212; 405/260
[58] Field of Search .................... 411/9–11, 411/14, 535, 536; 116/212, DIG. 34; 405/259, 260, 261

[56] References Cited

U.S. PATENT DOCUMENTS

| | | | |
|---|---|---|---|
| 3,174,386 | 3/1965 | Lewis | 411/10 |
| 4,289,061 | 9/1981 | Emmett | 411/9 |
| 4,889,457 | 12/1989 | Hageman | 411/10 |
| 4,954,018 | 9/1990 | Gauna | 411/10 |
| 4,984,937 | 1/1991 | Karpellus | 411/9 |

FOREIGN PATENT DOCUMENTS 774574  5/1957  United Kingdom ................ 411/10

Primary Examiner—Neill R. Wilson
Attorney, Agent, or Firm—Martin A. Farber

[57] ABSTRACT

A indicating-nut threaded coupling with load-indicating device (1) adapted to be arranged in particular on grouted anchors for mining or the like and in order to obtain a simple solution which is advantageous in use a free space is formed by at least one groove (4) equipped with a fold bottom (5), the groove being arranged in the outer wall (3) of a bushing (2) which extends spaced from the outer surface of the anchor.

2 Claims, 3 Drawing Sheets

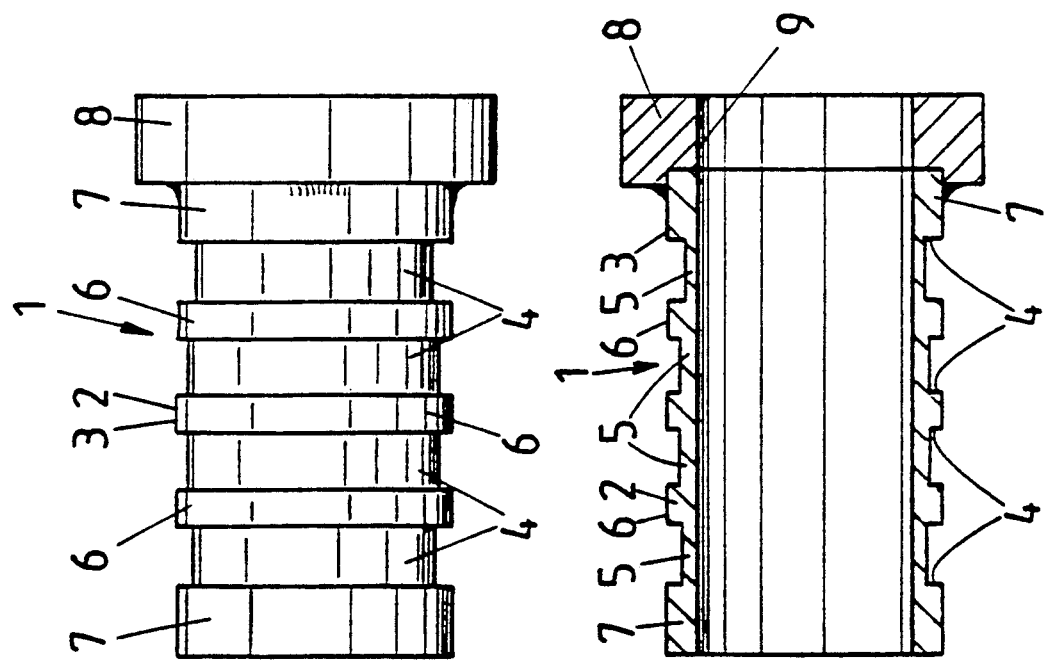

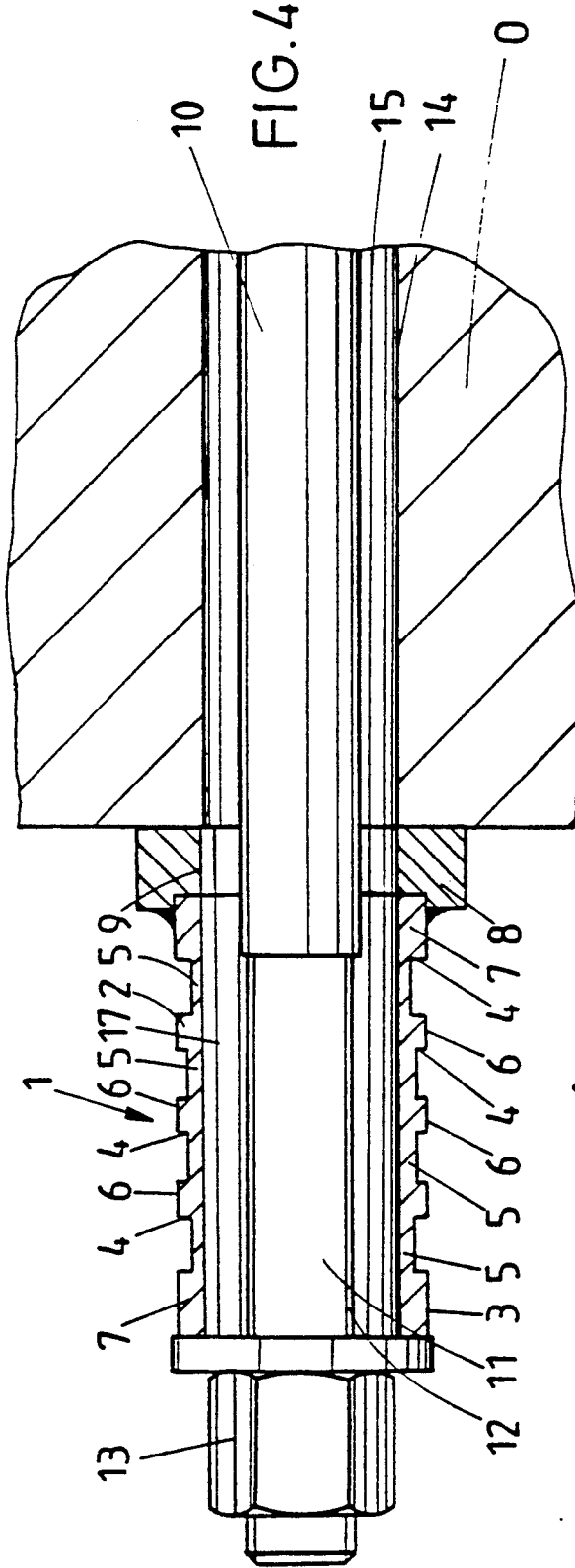
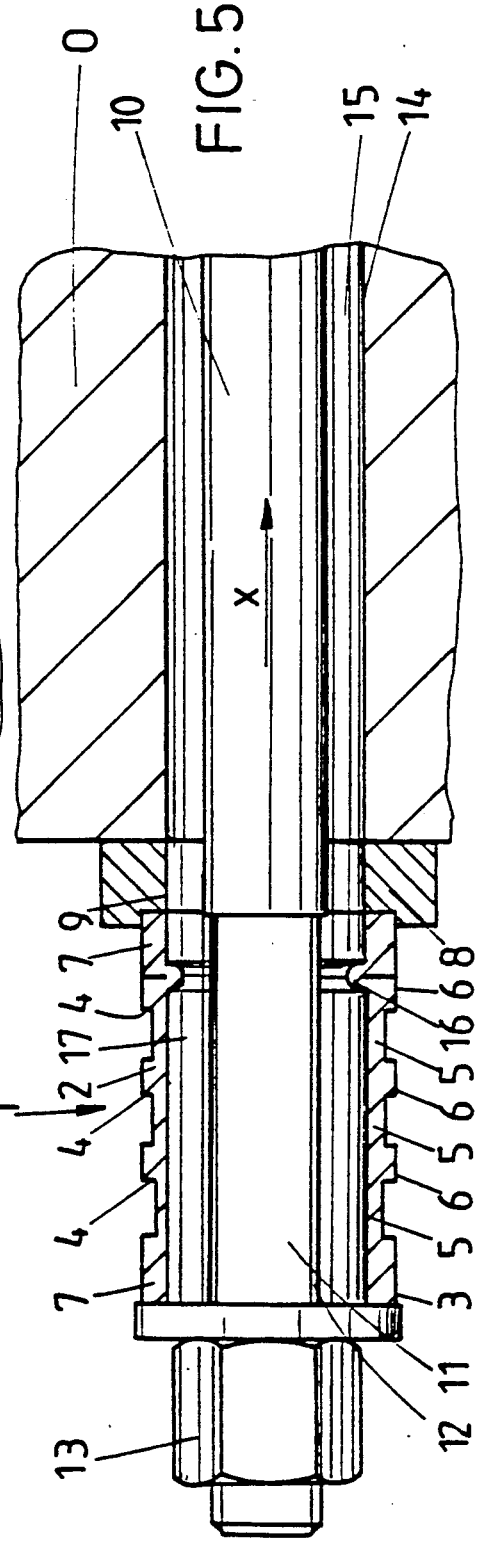

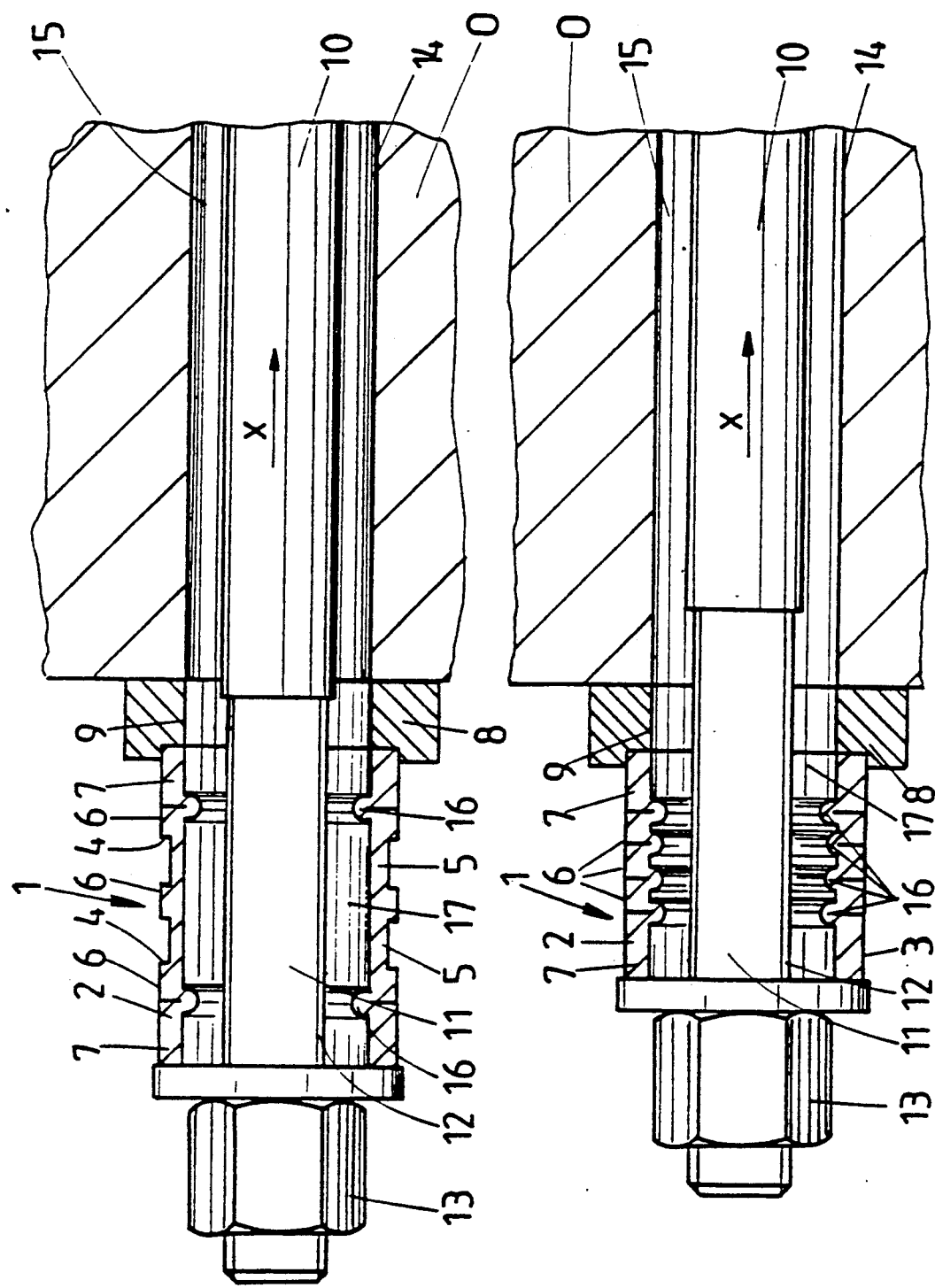

INDICATOR-NUT THREADED COUPLING WITH LOAD-INDICATING DEVICE ADAPTED TO BE ARRANGED ON ANCHORS, IN PARTICULAR GROUTED ANCHORS FOR MINING OR THE LIKE

FIELD AND BACKGROUND OF THE INVENTION

The present invention relates to an indicator-nut threaded coupling with load-indicating device, adapted to be arranged on anchors, in particular grouted anchors for mining or the like, it consisting of at least one free space lying on an outer wall surface, which space is narrowed and possibly closed when a certain limit load is exceeded.

Such an indicator nut threaded coupling with load-indicating device is available on the market, a bipartite hex nut being screwed on an anchor instead of a normal anchoring nut. This hex nut consists of an anchoring nut developed as load-bearing part and a test part facing the abutment. On the outer wall of the indicator nut there are slits which narrow and possibly close when a given limit load is exceeded, the nut ribs of the test part shearing off. As soon as the slit is closed, the anchoring force increases again rapidly up to the breaking load of the anchor. The slide path for the anchor which is freed by the yielding indicator nut is relatively small and frequently not sufficient for movements of strata or the like.

SUMMARY OF THE INVENTION

The object of the present invention is to make the manufacture and handling of an indicator nut threaded coupling with load indication simple so that, while it is of only relatively slight structural height, a sufficiently large slide path of an anchor is assured.

As a result of the development of the invention, an indicator nut threaded coupling with load-indicating device which is of increased value in use and increased safety is obtained. In this connection, one proceeds in the manner that the free space is formed by at least one groove which is provided with a fold bottom and is arranged in the outer wall of a bushing associated with the nut, the bushing extending at a distance from the outer surface of the anchor. An indicator developed in this manner serves to indicate the instantaneous maximum anchoring force of the anchor. Any anchoring forces which result from strata movements are conducted via the anchoring nut into the bushing, the groove narrowing and possibly closing when a given limit load is exceeded. This takes place in the form of a bulging in the region of the fold bottom of the groove arranged in the outer wall of the bushing, the bulged material traveling into the free space between bushing and outer surface of the anchor. When the indicator has bulged together in clearly visible manner upon the exceeding of the permissible anchoring force, the anchoring force can increase to the breaking load. The bushing, which is developed as a load-indicating device, is preferably made from a seamless pipe produced from fine-grain structural steel ST.52 and normalized by subsequent heat treatment. Thus, the bushing has very uniform strength properties over its entire cross section. In this way, an indicator is created which visibly indicates stresses and the permissible loading of the anchor. As soon as the permissible anchoring force is exceeded, the indicator commences to flow uniformly and frees a relatively large path of deformation. For stabilization against lateral evasion, the bushing is provided at each of its two ends with a support collar. This development assists in a radially symmetrical bulging and folding as planned. In the region of the anchor plate this is further supported in the manner that n edge reinforcement is welded on the bushing. One advantageous further development is that the width of the groove corresponds to a multiple of its depth. In this way, a bulging of the bushing according to plan is assured, the width of the groove corresponding approximately to the slide path of the anchor. This slide path can also be increased by providing several grooves arranged in rows spaced uniformly from each other. The ribs remaining between the grooves serve in this connection as stabilizing rings against kinking of the bushing. Experiments have shown that a radially symmetrical bulging is present if the groove width is in a ratio of 1.5 to 1 to the rib width, the groove width remaining less than 10 mm. For indicating several loading steps, the resistance to folding of the individual fold bottoms differ from each other. The indicator thus shows at least two load steps in addition to the maximum load. It can be provided that the resistance to folding of the groove lying next to the anchor plate is the smallest, so that this groove width bulges upon a given stressing. This bulged groove can, for instance, indicate that the anchor is stressed by means of an impact screwdriver. Only when the permissible anchor force is exceeded do the other grooves bulge in accordance with their resistance to folding. The indicator can thus indicate different load values defined in bulging tests. Finally, the resistance to folding of the individual fold bottoms is advantageously developed in the manner that the grooves have different depths. These groove depths, which are necessary for the individual load stages, can be produced very easily and accurately and be checked by bulge tests.

BRIEF DESCRIPTION OF THE DRAWINGS

Other advantages and details of the invention will be described in further detail below with reference to an embodiment shown in the drawing, in which FIG. 1 is a side view of a load-indicating device according to the invention;

FIG. 2 is an end view of the load-indicating device;

FIG. 3 is a longitudinal section through the load-indicating device of FIG. 1;

FIG. 4 shows a grouted anchor provided with an anchoring nut, the load-indicating device being associated with the anchoring nut;

FIG. 5 is a showing corresponding to FIG. 4, but also showing bulging of a groove having the weakest resistance to folding;

FIG. 6 is a sequential showing to FIG. 5, but upon the bulging of another groove; and FIG. 7 is another sequential showing to FIG. 6, in which all grooves of the load-indicating device are bulged.

DETAILED DESCRIPTION OF THE PREFERRED EMBODIMENT

The load indicating device 1 shown in FIG. 1 is formed of a seamless bushing 2. In the outer wall 3 of the bushing 2 there are provided four grooves 4 arranged in a row at a uniform distance from each other. These grooves 4 have groove depths of different size, so that the fold bottoms 5 remaining as residual annular cross sections have different resistances to folding. The groove width is so dimensioned that it corresponds approximately to 1.5 times the width of the ribs developed as stabilizing rings 6 which remain between the grooves 4. At each of its two ends the bushing 2 is provided with a support collar 7 which is of approximately twice the width of a stabilizing ring 6. At the end region in which the groove 4 having the largest groove depth, i.e. having the smallest resistance to folding of the fold bottom 5, is located, an edge reinforcement 8 is welded to the end of the bushing 2. This edge reinforcement 8 is of larger diameter than the bushing 2 but has an axial hole 9, the diameter of which corresponds to the inside diameter of the bushing 2.

The mounting shown in FIG. 4 has a tension member in the form of an anchor 10. As a rule, it consists of high-strength bar-shaped tension steel material. The anchor head 11 which extends freely from the object O has an external thread 12. This thread cooperates with the inner thread of the anchoring nut 13. The actual anchoring region, for instance in a section of rock of a slope or the like, has not been shown in detail. The exit end, on the other hand, shows a section of a bore hole 14 which leaves a free annular space 15 concentrically around the anchor cross section. The inside diameter thereof is so dimensioned that fissure displacements perpendicular to the anchor 10 which are to be expected do not lead to a shearing action. After the setting of the mount and the dying away of the strata deformations, the annular space 9 is generally filled with cement mortar.

The load-indicating device 1 is arranged between the anchoring nut 13 provided with a washer and the outer surface of the object O. The bushing 2 of the load-indicating device 1 extends in this connection spaced from the outer surface of the anchor and is so arranged that the edge reinforcement 8 rests against the outer surface of the object O.

The fold-bottom cover of the fold bottom 5 of the groove 4 adjacent the edge reinforcement 8 is the thinnest, with the result that when a given force in the direction x is exceeded, this groove 4 is bulged (see FIG. 5). By this closing of the free space (groove 4), it can thus be noted from the outside that a force is acting in x direction. The force which is indicated by the closing of this free space has been previously defined in bulge tests. There is also the possibility of using this groove 4 as a control indication for prior stressing. In this case, the anchor 10 is brought, by means of an impact screwdriver acting on the anchoring nut 13, to a previously defined prior stressing, the flow of force also taking place in x direction and thus effecting a closing of the groove 4. The bulged fold bottom 5 of the groove 4 grows as an annular bead 16, into the free annular space 17 between the bushing 2 and the outer surface of the anchor shaft.

When another defined anchor force in x direction is exceeded, the groove 4 provided with the next thicker fold bottom 5 bulges (see FIG. 6). If the anchor force in x direction exceeds a permissible maximum value, this can be noted from the fact that all four grooves 4 are bulged. This indication is visible from all sides and can be noted even by untrained personnel. As can be noted from FIG. 7, the load indicator 1 has a practically flat surface of the bushing 2 in this state in which of the permissible anchor force is extended. This is a signal that the anchor force can now increase up to breakage load. This signaling can further be supported in the manner that the outer wall surface of the bushing 2 is provided with a signal color. When the permissible anchor force is exceeded, the color applied to the stabilization rings 6 and the support collar 7 acts as further optical signal.

In the case of the load-indicating device 1 described as an example, the ratio between groove width and width of the stabilization rings is indicated with a value of about 1.5 to 1. The deformation path of the load-indicating device 1 corresponds approximately to half the structural height of the load-indicating device 1. Thus a sufficiently dimensioned slide path of the anchor 10 is obtained with relatively low structural height.

The features of the invention disclosed in the above specification, drawing and claims can be of importance for the invention both individually and in any desired combination.

We claim:

1. In an indicator-nut threaded coupling comprising a load-indicating device adapted to be arranged on an anchor, particularly a grouted anchor for mining or the like, wherein said load-indicating device defines a free space on an outer surface thereof, and wherein said space is narrowed and possibly closes upon exceeding a given limit load, the improvement in the indicator-nut threaded coupling comprising a nut engageable with the anchor, said free space is formed by a plurality of grooves, each of said grooves being formed with a fold bottom, and wherein said load-indicating device comprises a bushing associated with said nut and extending spaced from an outer surface of the anchor, said grooves being arranged in an outer wall of said bushing, and wherein resistance to folding of individual of the fold bottoms differs from each other.

2. In an indicator-nut threaded coupling comprising a load-indicating device adapted to be arranged on an anchor, particularly a grouted anchor for mining or the like, wherein said load-indicating device defines a free space on an outer surface thereof, and wherein said space is narrowed and possibly closes upon exceeding a given limit load, the improvement in the indicator-nut threaded coupling comprising a nut engageable with the anchor, said free space is formed by a plurality of grooves, each of said grooves being formed with a fold bottom, and wherein said load-indicating device comprises a bushing associated with said nut and extending spaced from an outer surface of the anchor, said grooves being arranged in an outer wall of said bushing, and wherein said grooves are of different depth.

* * * * *